United States Patent
Hamada

(10) Patent No.: US 8,730,348 B2
(45) Date of Patent: May 20, 2014

(54) RECORDING APPARATUS AND CONTROL METHOD THEREOF

(75) Inventor: Naru Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 13/014,349

(22) Filed: Jan. 26, 2011

(65) Prior Publication Data

US 2011/0187896 A1    Aug. 4, 2011

(30) Foreign Application Priority Data

Feb. 3, 2010  (JP) ................................. 2010-022523

(51) Int. Cl.
*H04N 5/76* (2006.01)

(52) U.S. Cl.
USPC ...................................... 348/231.2

(58) Field of Classification Search
CPC ............ H04N 1/2112; H04N 2101/00; H04N 1/2158; H04N 5/772; H04N 5/23245
USPC ............... 348/231.99–231.9, 220.1; 711/103; 386/263, 239, 248
See application file for complete search history.

(56) References Cited

U.S. PATENT DOCUMENTS

| | | | |
|---|---|---|---|
| 6,031,758 A | 2/2000 | Katayama et al. | |
| 6,295,257 B1 * | 9/2001 | Ito et al. | 369/47.14 |
| 7,283,729 B2 | 10/2007 | Chung et al. | |
| 7,979,636 B2 * | 7/2011 | Ito | 711/115 |
| 8,314,857 B2 | 11/2012 | Nakase et al. | |
| 8,611,194 B2 | 12/2013 | Akahoshi | |
| 2003/0041253 A1 | 2/2003 | Matsui et al. | |
| 2003/0191980 A1 | 10/2003 | Gotoh et al. | |
| 2005/0259163 A1 | 11/2005 | Tsujii et al. | |
| 2007/0222896 A1 | 9/2007 | Oikawa | |
| 2008/0046649 A1 | 2/2008 | Ito | |
| 2009/0180209 A1 | 7/2009 | Maeda et al. | |
| 2009/0313444 A1 | 12/2009 | Nakamura | |
| 2010/0115185 A1 | 5/2010 | Ono et al. | |
| 2011/0187894 A1 * | 8/2011 | Hamada et al. | 348/231.1 |

(Continued)

FOREIGN PATENT DOCUMENTS

| | | |
|---|---|---|
| JP | 09-223363 A | 8/1997 |
| JP | 2002-109895 | 4/2002 |

(Continued)

OTHER PUBLICATIONS

The above references were cited in a Jun. 12, 2013 U.S Office Action, that issued in related U.S. Appl. No. 12/977,663.

(Continued)

*Primary Examiner* — Aung S Moe
(74) *Attorney, Agent, or Firm* — Cowan, Liebowitz & Latman, P.C.

(57) ABSTRACT

A recording apparatus is disclosed that records information data and file system information for managing a file containing the information data in accordance with a predetermined file system to a recording medium having a plurality of blocks including an alternative block for a defect block, wherein a first threshold and a second threshold that is smaller than the first threshold are set, and recording of the information data to the recording medium is inhibited if an alternative block remaining amount in the recording medium is less than or equal to the first threshold, and an update of the file system information recorded in the recording medium is inhibited if the alternative block remaining amount is less than or equal to the second threshold.

14 Claims, 6 Drawing Sheets

(56) References Cited

U.S. PATENT DOCUMENTS

2011/0188834 A1* 8/2011 Matsushima ............ 386/248
2011/0264842 A1 10/2011 Nakanishi et al.
2011/0283054 A1 11/2011 Kozakai et al.

FOREIGN PATENT DOCUMENTS

| JP | 2004-158953 A | 6/2004 |
|---|---|---|
| JP | 2005-252499 A | 9/2005 |
| JP | 2006-025213 A | 1/2006 |
| JP | 2008-009594 A | 1/2008 |
| JP | 2008-046923 | 2/2008 |
| JP | 2008-097148 A | 4/2008 |
| JP | 2008-097169 A | 4/2008 |
| WO | 2008/018446 A1 | 2/2008 |
| WO | 2009/001519 A1 | 12/2008 |

OTHER PUBLICATIONS

Naru Hamada, U.S. Appl. No. 12/977,663, filed Dec. 23, 2010.
Shuichiro Matsushima, U.S. Appl. No. 13/013,425, filed Jan. 25, 2011.
Naru Hamada, U.S. Appl. No. 13/013,474, filed Jan. 25, 2011.
These references were cited in a Jul. 12, 2012 U.S. Office Action, that issued in related U.S. Appl. No. 13/013,425.
The above references were cited in a May 3, 2012 U.S Office Action, that issued in related U.S. Appl. No. 12/977,663.
This reference was cited in an Apr. 3, 2013 U.S. Office Action, that issued in related U.S. Appl. No. 13/013,474.
Dec. 30, 2013 U.S. Notice of Allowance, which is not enclosed, that issued in related U.S Appl. No. 12/977,663.

* cited by examiner

US 8,730,348 B2

RECORDING APPARATUS AND CONTROL METHOD THEREOF

BACKGROUND OF THE INVENTION

1. Field of the Invention

The present invention relates to a recording apparatus utilizing a flash memory and a control method of the recording apparatus.

2. Description of the Related Art

Conventionally, video cameras that record moving images and audio to recording media are known. More recently, video cameras that record moving images and audio to a large capacity flash memory or a memory card incorporating a flash memory have appeared.

A flash memory writes and reads out data in units called blocks. There are cases, however, in which a defect block in which data cannot be written normally may occur during the manufacturing process or due to a later cause. To address this, a part of the memory is prepared for use as alternative blocks for such a defect block, and data that is supposed to be recorded to the defect block is written to an alternative block (see, for example, Japanese Patent Laid-Open No. 2008-046923).

However, even when a part of the flash memory is prepared for use as alternative blocks as described above, if a defect block occurs after the alternative blocks have been used up, normal data writing is not possible, causing a writing error. In particular, when such a situation occurs during the writing of file system information to close a file, the file cannot be closed, and there is a possibility that not only this file but also all files recorded in the memory up to that point may not be able to be read out.

When data is recorded to a flash memory, the recorded data is generally managed in accordance with a predetermined file system such as FAT(File Allocation Table). Accordingly, if the alternative blocks are used up during recording of moving images with a video camera, when a defect block is found during recording of file system information for managing the recorded file, rewriting of the file system information is not possible. Furthermore, if the alternative blocks are used up during an update of the file system, the file system information might be corrupted, and data that has already been recorded might not be able to be read out.

SUMMARY OF THE INVENTION

The present invention has been made in view of the above-described problems, and an embodiment of the present invention provides a recording apparatus that can normally record data containing file system information to a recording medium having alternative blocks and a control method of the recording apparatus.

According to one aspect of the present invention, there is provided a recording apparatus comprising: a recording unit configured to record information data and file system information for managing a file containing the information data in accordance with a predetermined file system to a recording medium having a plurality of blocks including an alternative block for a defect block; a setting unit configured to set a first threshold and a second threshold that is smaller than the first threshold; and a control unit configured to inhibit recording of the information data to the recording medium if an alternative block remaining amount in the recording medium is less than or equal to the first threshold, and inhibit updating of the file system information recorded in the recording medium if the alternative block remaining amount is less than or equal to the second threshold.

According to another aspect of the present invention, there is provided a recording apparatus comprising: a recording unit configured to record information data as a file and file system information for managing the file containing the information data in accordance with a predetermined file system in a recording medium having a plurality of blocks including an alternative block for a defect block; and a control unit configured to inhibit both recording of the information data in the recording medium and update of the file system information recorded in the recording medium if a alternative block remaining amount in the recording medium is less than or equal to a threshold, and permit update of the file system information recorded in the recording medium while inhibiting recording of the information data in the recording medium if the alternative block remaining amount in the recording medium is larger than the threshold.

Further features of the present invention will become apparent from the following description of exemplary embodiments with reference to the attached drawings.

DESCRIPTION OF THE EMBODIMENTS

Figure 1:
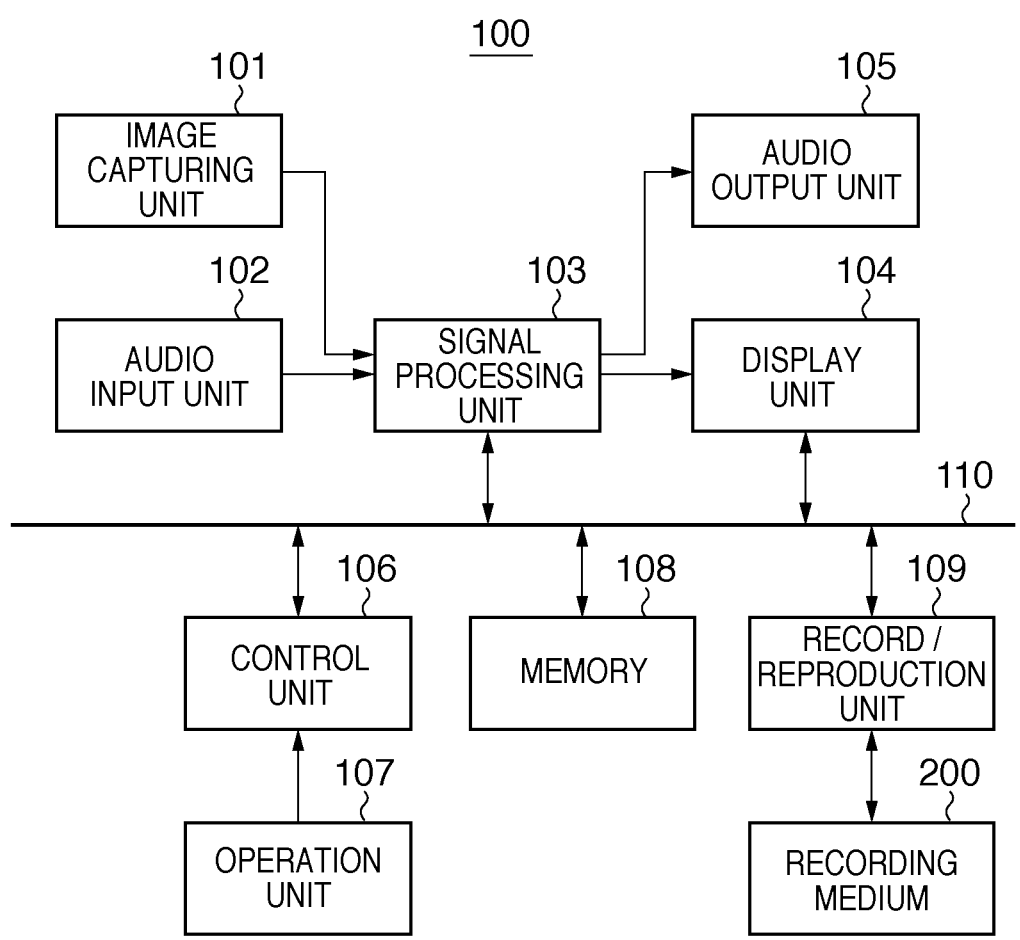
FIG. 1 is a diagram showing a configuration of a video camera according to an embodiment of the present invention.

FIG. 1 is a block diagram showing a configuration of a video camera 100 according to a first embodiment of the present invention.

Hereinafter, a preferred embodiment of the present invention will be described with reference to the accompanying drawings.

In FIG. 1, an image capturing unit 101 captures images of an object and outputs moving image data to a signal processing unit 103. An audio input unit 102 has a microphone, and outputs audio data to the signal processing unit 103. When recording, the signal processing unit 103 performs necessary processing, such as compression, encoding and the like according to a predetermined encoding method such as MPEG, on the moving image data from the image capturing unit 101 and the audio data from the audio input unit 102. When reproducing, the signal processing unit 103 decodes reproduced moving image data and audio data. A display unit 104 displays captured moving images from the signal processing unit 103 when recording. When reproducing, the display unit 104 displays reproduced moving images. The display unit 104 also displays information necessary for user operations such as a menu. An audio output unit 105 has a speaker, and outputs an audio signal from the signal processing unit 103.

A control unit 106 has a microcomputer, a memory and the like, and controls various constituent units of the video camera 100. An operation unit 107 has a power switch, a switch for issuing instructions to start and stop recording, a switch for switching to a reproduction mode, a menu switch, and the like. The user can designate a function of the video camera 100 through operation of any of the switches of the operation unit 107. A memory 108 has an SDRAM or the like, and stores compressed moving image data, audio data, and other necessary data. The memory 108 also functions as a buffer memory when recording or reproducing data to or from a recording medium 200. A record/reproduction unit 109 writes or reads out data to or from the recording medium 200 in accordance with an instruction from the control unit 106. The recording medium 200 is a random access recording medium, and is a flash memory card in the present embodiment. The recording medium 200 can be easily attached to and detached from the video camera 100 by the user with an attachment/detachment mechanism (not shown). A system bus 110 transmits data and various commands between the blocks.

In the present embodiment, the control unit 106 manages information data, such as moving images and audio, recorded in the recording medium 200 as a file in accordance with a predetermined file system such as FAT file system. Accordingly, in addition to the information file in which information data is stored, file system information for managing the recorded file is recorded to the recording medium 200. The file system information recorded in the recording medium 200 is updated along with information file recording processing. The record/reproduction unit 109 may have a configuration corresponding to a general-purpose interface such as ATA (Advanced Technology Attachment). In this case, the control unit 106 controls writing and readout of data to and from the recording medium 200 by outputting a command defined by the general-purpose interface to the record/reproduction unit 109.

Figure 2:
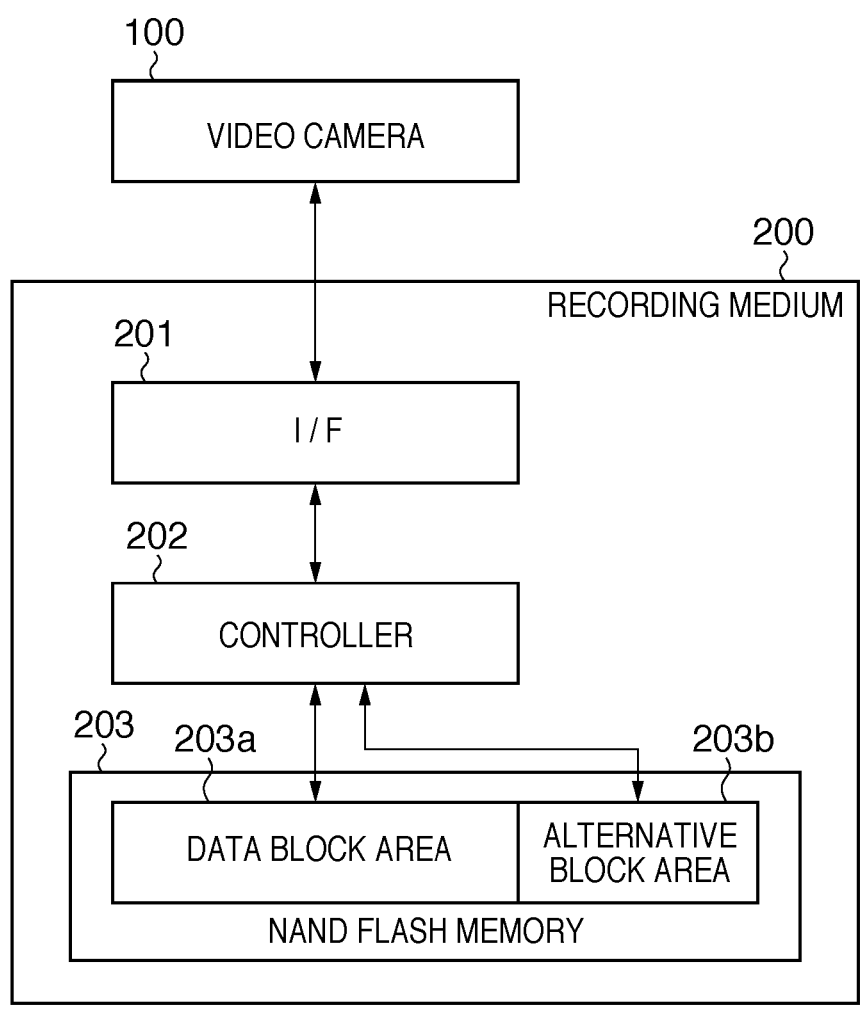
FIG. 2 is a diagram showing a configuration of a recording medium according to the embodiment of the present invention.

Next, the recording medium 200 will be described. FIG. 2 is a block diagram showing a configuration of the recording medium 200. As shown in FIG. 2, the recording medium 200 has an interface (I/F) 201 that transmits and receives data and commands to and from a recording apparatus such as the video camera 100, a controller 202, and a NAND flash memory 203. The recording medium 200 is capable of writing data into the flash memory 203 in blocks, each consisting of a plurality of bytes, and is configured such that a part of all blocks is utilized as alternative blocks for defect blocks in which data cannot be written normally. In other words, the flash memory 203 has a data block area 203a and an alternative block area 203b for defect blocks in the data block area. In the present embodiment, physical addresses of a predetermined area in the memory 203 have been allocated in advance as the alternative block area 203b.

In FIG. 2, the interface (I/F) 201 transmits and receives commands and data to and from the record/reproduction unit 109 of the video camera 100. The controller 202 controls writing or readout of data to or from the flash memory 203 in response to a command received by the I/F 201. For example, upon receiving a write request command from the record/reproduction unit 109, the controller 202 receives data to be written from the record/reproduction unit 109 and writes the data to the data block area 203a. If the writing processing has completed normally, the controller 202 generates a writing result as a response, and transmits the response to the record/reproduction unit 109 via the recording I/F 201.

If the writing of data to the data block area 203a does not complete within a predetermined period of time, the controller 202 determines that a defect block has occurred, and writes the data to an unused block in the alternative block area 203b instead of the defect block. The controller 202 then changes an address map of the flash memory 203 so as to replace the address of the defect block with the address of the alternative block. Furthermore, the controller 202 generates a response indicating a writing error, and transmits the response to the record/reproduction unit 109 via the I/F 201. Upon occurrence of a defect block(s), the controller 202 writes information regarding the position and the number of defect blocks that have occurred, and so on, to a system management area in the data block area 203a. In other words, the controller 202 allocates an address (physical address) in the flash memory 203 to an address (logical address) designated by an external device, and generates an address map indicating correspondences between logical addresses and physical addresses. Then, when a defect block occurs, the controller 202 changes the address map so as to allocate the physical address of an alternative block to the designated logical address. The controller 202 saves the address map in the data block area 203a.

If the alternative blocks in the alternative block area 203b have been used up, the controller 202 writes information indicating that the recording medium is a reproduction-only (read-only) recording medium to the system management area in the data block area 203a. By doing so, the controller 202 can transmit a response indicating that the recording medium is for reproduction only when a query for the operational state of the recording medium 200 is received from a host device such as the video camera 100.

As will be described later, the controller 202 detects the alternative block remaining amount when a request to transmit available remaining amount in the alternative block area is received from the video camera 100. Then, the controller 202 notifies the record/reproduction unit 109 of information indicating the alternative block remaining amount via the I/F 201.

Figure 3:
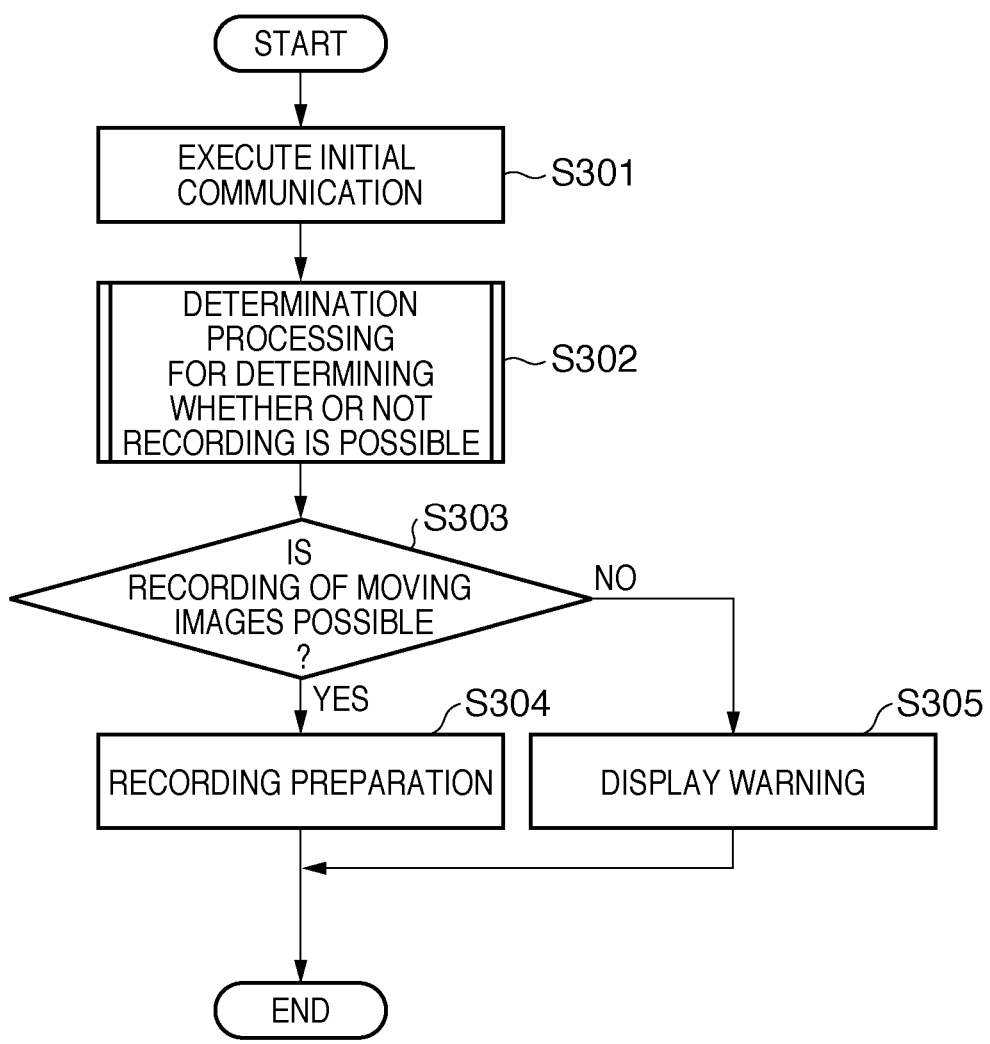
FIG. 3 is a flowchart illustrating recording medium mounting processing.

Next, a description of recording preparation (mounting) processing for the recording medium 200 performed when the recording medium 200 is attached and when the power of the video camera 100 is turned on will be given. FIG. 3 is a flowchart illustrating the mounting processing. The processing shown in FIG. 3 is executed by the control unit 106 controlling various units.

When the power of the video camera 100 is turned on, the record/reproduction unit 109 determines whether the recording medium 200 is attached, and if the recording medium 200 is attached, the record/reproduction unit 109 so notifies the control unit 106. Alternatively, the record/reproduction unit 109 detects that the recording medium 200 has been newly attached while the power of the video camera 100 is on, and so notifies the control unit 106. The processing shown in FIG. 3 starts when the record/reproduction unit 109 notifies that the recording medium 200 is attached upon power-on of the video camera 100 or when the record/reproduction unit 109 detects that the recording medium 200 has been newly attached as described above.

Firstly, the control unit 106 executes initial communication (S301). In the initial communication, the control unit 106 resets the controller 202 of the recording medium 200, and receives register information of the recording medium 200 necessary to record data from the recording medium 200. Next, the control unit 106 executes determination processing for determining whether recording of data (moving image data in the present embodiment) to the recording medium 200 is possible in accordance with the obtained information (S302). The determination processing will be described later in detail. If it is determined that recording is possible (S303), the control unit 106 executes recording preparation processing (S304). More specifically, the control unit 106 reads out file system information from the recording medium 200, stores the file system information in the memory 108, analyzes the content of the file system information, and obtains information necessary for recording such as the remaining recording capacity of the recording medium 200. Also, the control unit 106 checks the files recorded in the recording medium 200, and searches for a file that can be managed by the video camera 100. If, on the other hand, it is determined in S303 that recording is not possible, warning information indicating that data recording is not possible to the recording medium 200 is displayed on the display unit 104, and the mounting processing ends without performing recording preparation processing.

Figure 4:
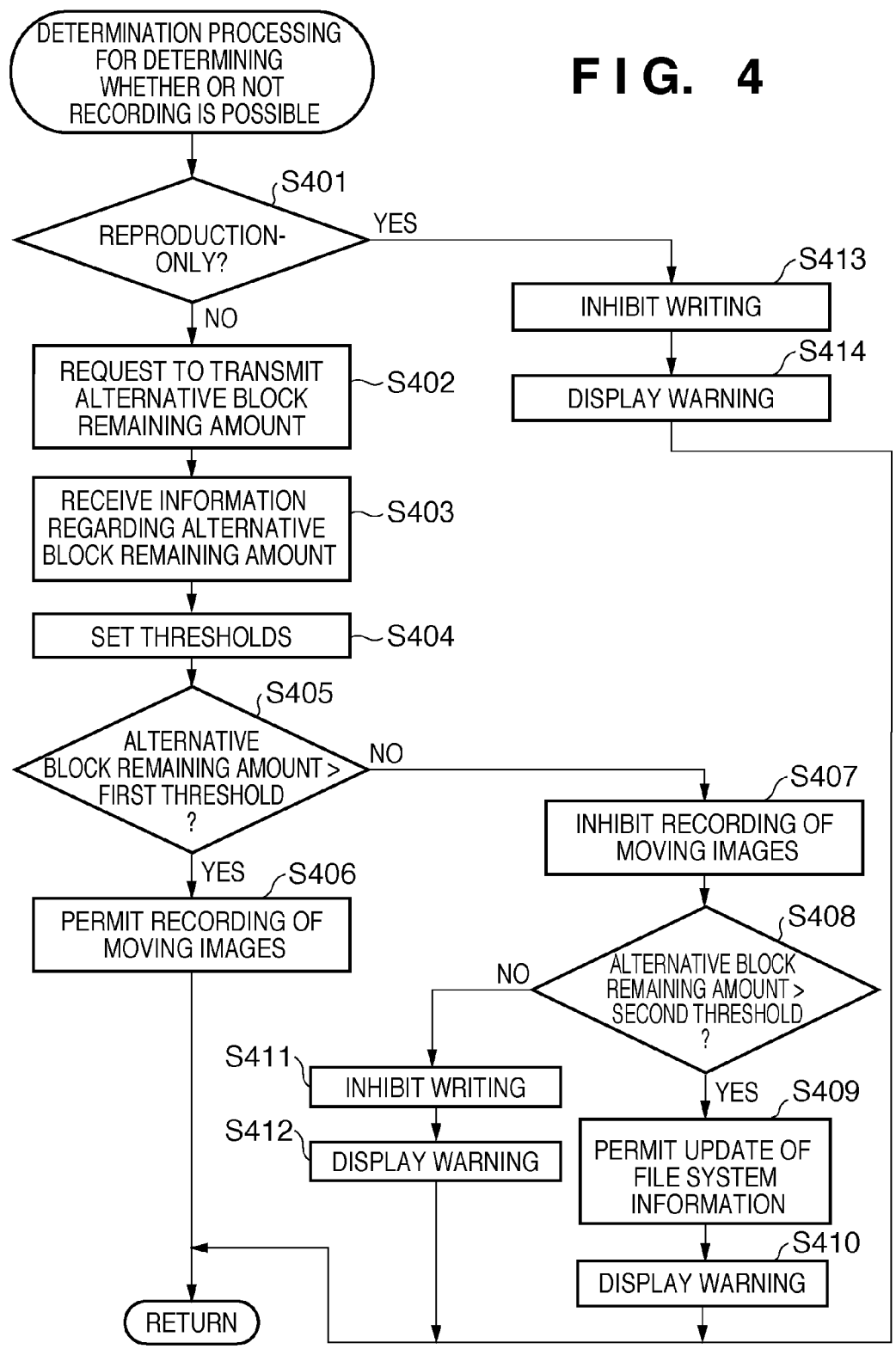
FIG. 4 is a flowchart illustrating determination processing for determining whether or not recording is possible.

Next, the determination processing (S302), for determining whether or not recording is possible, that is performed in the processing for mounting the recording medium 200 (FIG. 3) will be described. FIG. 4 is a flowchart illustrating the determination processing for determining whether or not recording is possible. In FIG. 4, firstly, the control unit 106 queries the recording medium 200 for the state of the recording medium 200, and determines whether the recording medium 200 is a reproduction-only recording medium based on a response from the controller 202 of the recording medium 200 (S401). If it is determined that the recording medium 200 is a reproduction-only recording medium, the control unit 106 inhibits data recording (S413), and displays warning information indicating the fact on the display unit 104 (S414).

If, on the other hand, it is determined in S401 that the recording medium 200 is not a reproduction-only recording medium, the control unit 106 requests the controller 202 of the recording medium 200 to transmit information regarding the alternative block remaining amount (S402). Upon receiving the request for information regarding the alternative block remaining amount from the video camera 100, the controller 202 detects the remaining amount of alternative blocks (the amount of unused alternative blocks) in the alternative block area 203b, and transmits information indicating the alternative block remaining amount to the record/reproduction unit 109. The record/reproduction unit 109 receives the information indicating the alternative block remaining amount, and transmits the information to the control unit 106 (S403).

Next, the control unit 106 sets thresholds for comparison with the alternative block remaining amount in the alternative block area 203b of the recording medium 200 (S404). The processing for setting the thresholds will be described later. The control unit 106 then compares a first threshold that has been set with the received alternative block remaining amount (S405). If the result of comparison indicates that the alternative block remaining amount is larger than the threshold, the control unit 106 permits recording of moving images (S406).

If the alternative block remaining amount is less than or equal to the first threshold, the control unit 106 inhibits recording of moving images (S407), and compares the alternative block remaining amount with a second threshold (S408). If the alternative block remaining amount is larger than the second threshold, the control unit 106 permits execution of a function of performing only file system information update, for example, file deletion, file name change, operation of the folder in which the file is stored, or the like (S409), and displays warning information indicating the fact on the display unit 104 (S410). The warning information can be, for example, "recording of moving images is not possible, but file deletion is possible". If, on the other hand, the alternative block remaining amount is less than or equal to the second threshold, the control unit 106 inhibits writing of data to the recording medium 200 (S411), and displays warning information indicating the fact on the display unit 104 (S412). The warning information displayed in S412 can be, for example, "recording of moving images and file detection are not possible".

Figure 5:
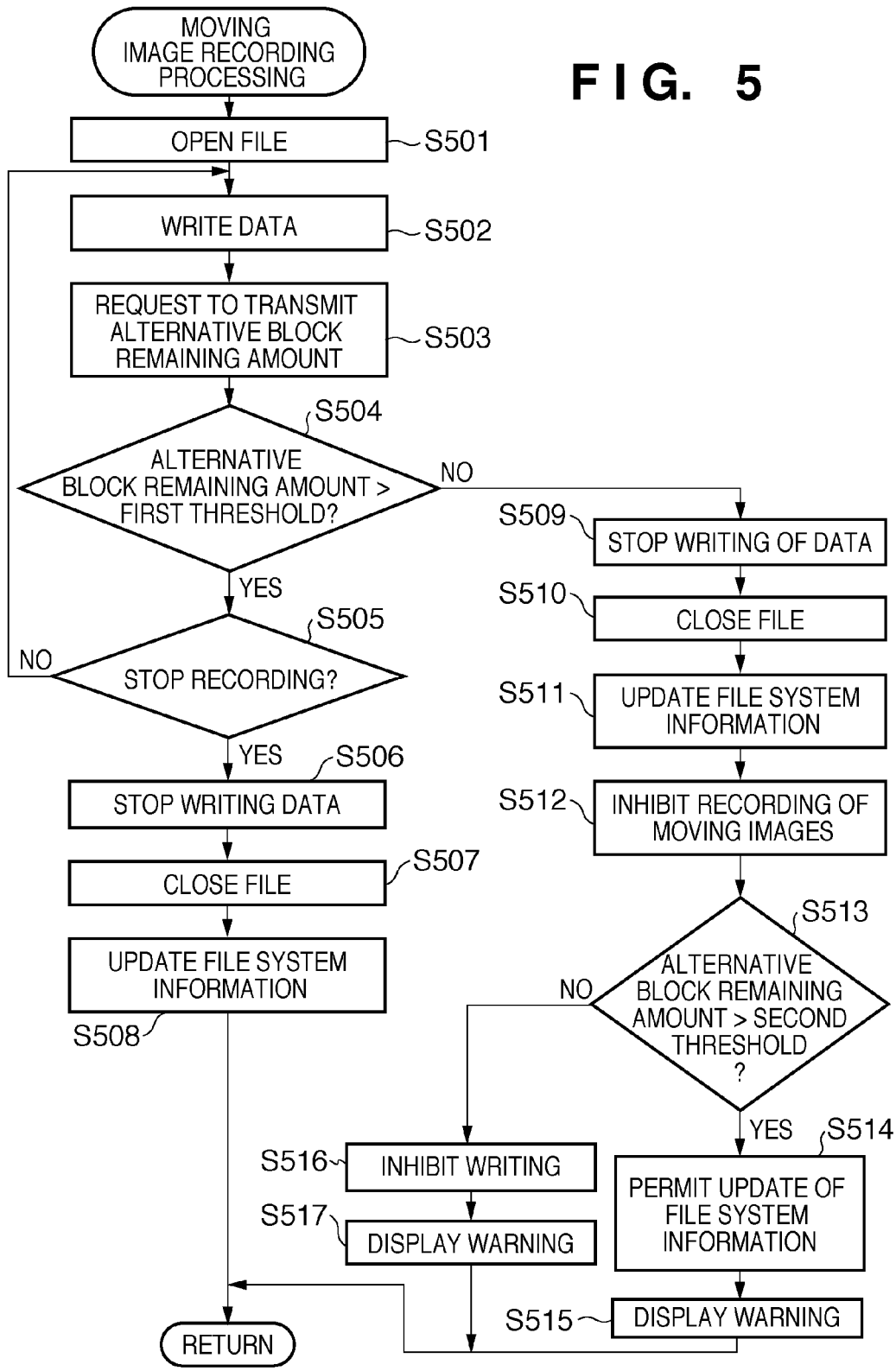
FIG. 5 is a flowchart illustrating moving image recording processing.

Next, moving image recording processing will be described. FIG. 5 is a flowchart illustrating moving image recording processing of the video camera 100. The processing shown in FIG. 5 is executed by the control unit 106 controlling various units. When the user issues an instruction to start recording through operation of the operation unit 107, the processing shown in FIG. 5 starts. Firstly, the control unit 106 performs file open processing for opening a moving image file for storing captured moving image data and input audio data (S501). In this processing, the control unit 106 determines the file name, and registers the file information thereof in the file system information stored in the memory 108.

Also, the control unit 106 controls the signal processing unit 103 so as to compress the moving image data from the image capturing unit 101 and the audio data from the audio input unit 102, and stores the compressed moving image data and audio data in the memory 108. Then, when a predetermined amount of moving image data and audio data corresponding to a writing unit is temporarily stored in the memory 108, the control unit 106 reads out the data from the memory 108, and writes the data into the recording medium 200 (S502). In the present embodiment, the rate at which data can be written into the recording medium 200 is higher than the rate of the moving image data and audio data output from the signal processing unit 103. Accordingly, writing of data to the recording medium 200 is performed intermittently. The memory 108 functions as a buffer memory for such intermittent recording. Specifically, when the amount of moving image data and audio data corresponding to a set writing unit has been stored in the memory 108, the control unit 106 starts data writing to the recording medium 200. After that, when writing of data per writing unit is complete, the control unit 106 stops data writing to the recording medium 200. In this manner, by repeating the writing of data per writing unit, data is intermittently written.

When a single recording unit of data has been written in the manner described above, the control unit 106 requests the recording medium 200 to transmit information regarding the alternative block remaining amount (S503). The controller 202 of the recording medium 200 detects the alternative block remaining amount in the manner described above, and transmits information indicating the remaining amount. Upon receiving the information indicating the alternative block remaining amount, the control unit 106 compares the alternative block remaining amount with the first threshold, and determines whether the alternative block remaining amount is larger than the first threshold (S504).

If the alternative block remaining amount is larger than the first threshold, the control unit 106 continues writing, and waits for an instruction to stop recording from the user. If the user issues an instruction to stop recording through operation of the operation unit 107 (S505), the control unit 106 soon stops storing new moving image data and audio data in the memory 108, writes the stored data into the recording medium 200, and thereafter stops writing (S506). Then, the control unit 106 closes the currently recorded file (S507), changes the content of the file system information stored in the memory 108, and writes the file system information into the recording medium 200, thereby updating the file system information (S508).

If, on the other hand, it is determined in S504 that the alternative block remaining amount is less than or equal to the first threshold, the control unit 106 stops writing data without waiting for a user's instruction to stop recording (S509), and closes the currently recorded file (S510). Then, the control unit 106 changes the content of the file system information stored in the memory 108 along with the stopping of recording, writes the file system information into the recording medium 200, and thereby updates the file system information in the recording medium (S511). Then, the control unit 106 thereafter inhibits recording of moving images (S512).

Furthermore, the control unit 106 compares the alternative block remaining amount with the second threshold (S513), and if the alternative block remaining amount is larger than the second threshold, the control unit 106 permits the function of performing only file system information update (S514). Then, the control unit 106 displays warning information indicating the fact on the display unit 104 (S515). The warning information displayed in S515 is the same as that displayed in S410. If the alternative block remaining amount is less than or equal to the second threshold, the control unit 106 inhibits writing of any data to the recording medium 200 (S516), and displays warning information indicating the fact on the display unit 104 (S517). The warning information displayed in S517 is the same as that displayed in S412.

Figure 6:
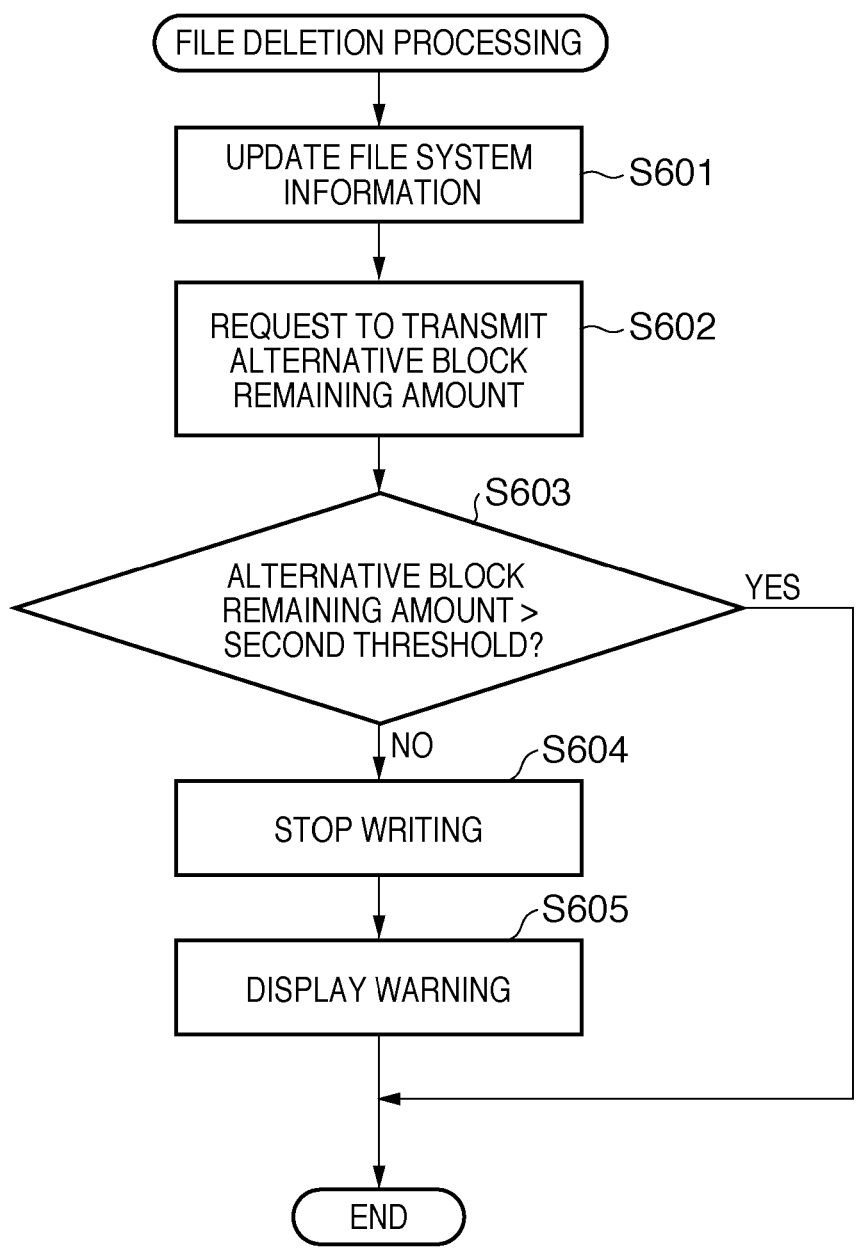
FIG. 6 is a flowchart illustrating file deletion processing.

Next, file deletion processing will be described. FIG. 6 is a flowchart illustrating file deletion processing. The processing shown in FIG. 6 is executed by the control unit 106 controlling various units. The processing of FIG. 6 starts when the user selects a file to be deleted from among the moving image files recoded in the recording medium 200 and issues an instruction to delete the file through operation of the operation unit 107.

Firstly, the control unit 106 changes the content of the file system information stored in the memory 108 so as to delete the moving image file selected for deletion. Then, the control unit 106 records the file system information in the recording medium 200 by using the record/reproduction unit 109, and thereby updates the file system information (S601). Next, the control unit 106 requests the recording medium 200 to transmit information regarding the alternative block remaining amount (S602). The controller 202 of the recording medium 200 detects the alternative block remaining amount in the manner described above, and transmits information indicating the remaining amount. Upon receiving the information regarding the alternative block remaining amount, the control unit 106 compares the alternative block remaining amount with the second threshold (S603), and if the alternative block remaining amount is larger than the second threshold, the processing ends. If the alternative block remaining amount is less than or equal to the second threshold, the control unit 106 inhibits writing of any data to the recording medium 200 (S604), and displays warning information indicating the fact on the display unit 104 (S605). As a result, the file deletion processing is no longer effective.

Next, the thresholds set in S404 of FIG. 4 will be described. In the present embodiment, the second threshold is set such that when updating the file system information recorded in the recording medium 200, even if the blocks designated to record the file system information are all defect blocks, the file system information can be updated by recording the file system information in alternative blocks.

The amount of data needed to update the file system information when closing a file is, in the case of FAT32, for example, the sum of a block capacity needed to write a file entry and a block capacity needed to update the FAT. For example, where the size needed to update the FAT and file entry is assumed to be 4 Mega Bytes (MB), if the alternative block remaining amount is 4 MB or more when closing the file, the file system information can be updated normally. Here, if the size of one block in the recording medium 200 is assumed to be 2 MB, the number of alternative blocks needed to update the file system information will be two. It should be noted that the size of one block of 2 MB is merely exemplary, and the present invention is not limited thereto. In this manner, the number of blocks corresponding to the amount of data needed to update the file system information is set as the second threshold.

Also, in the present embodiment, the first threshold is set based on the amount of data per writing unit and the amount of data needed to update the file system information. For example, in S503 of FIG. 5, a query for the state of alternative blocks is made after completion of writing of data per writing unit, and if the alternative block remaining amount is low, recording is stopped. Accordingly, by setting the total of the amount of the single writing unit of data and the size of the file system information as the threshold, at least one writing unit of data to be written next can be written into an alternative block even if a defect block occurs. Also, even if a defect block occurs when updating the file system information, it is possible to reliably complete the update of the file system by utilizing alternative blocks.

For example, if one writing unit is assumed to be N bytes, writing data into the recording medium 200 starts each time N-byte data is stored in the memory 108. And, the sum of N bytes and the size needed to update the file system information is set as the first threshold. For example, if the amount of data needed to update the file system information is assumed to be M bytes, the first threshold is set to N+M bytes.

In this manner, the first threshold for determining whether to permit recording of moving images and the second threshold for determining whether to permit the function of performing only file system information update while inhibiting recording of moving images are set. Accordingly, in the present embodiment, the first threshold is set larger than the second threshold. More specifically, the second threshold is set so as to secure the amount of data needed to update the file system information, and the first threshold is set larger than the second threshold. The number of blocks corresponding to the above-described data amount or above-described data amount may be set as the thresholds. When the data amount is set as thresholds, the remaining number of alternative blocks may be converted to a storage capacity by using the storage capacity per block of the recording medium 200, and the converted storage capacity is compared with the threshold.

If the size of one writing unit is reduced, the thresholds can be set to smaller values. The smaller the thresholds, the more alternative block capacity will be used by the time recording is stopped, enabling more efficient use of the recording medium. This, however, increases the frequency of issuance of write instructions from the control unit 106 to the record/reproduction unit 109. On the other hand, if the size of one writing unit is increased, the frequency of issuance of write instructions from the control unit 106 to the record/reproduction unit 109 can be decreased, enabling efficient use of the bandwidth of the system bus 110.

In the present embodiment, in FIG. 5, the control unit 106 queries the recording medium 200 for the state of the alternative block remaining amount each time the writing of one writing unit of data is completed, but the present invention is not limited thereto. It is possible to, for example, make a query as to the alternative block remaining amount before the writing of one writing unit of data starts. Also, if the alternative block remaining amount is sufficiently large, the query frequency may be reduced, rather than making a query for the alternative block remaining amount each time writing of one writing unit of data is complete.

Next, reproduction processing will be described. Upon receiving an instruction for a reproduction mode from the operation unit 107, the control unit 106 controls the record/reproduction unit 109 so as to read out each moving image file recorded in the recording medium 200 and output the moving image file to the signal processing unit 103. The signal processing unit 103 decodes the first image of each moving image file, generates a representative image for each moving image file by using the first image, and displays a list of representative images on the display unit 104.

When the user selects a desired representative image from the list of representative images, and issues an instruction to start reproduction, the control unit 106 instructs the record/reproduction unit 109 so as to reproduce the moving image file corresponding to the selected representative image. The record/reproduction unit 109 reproduces the selected moving image file from the recording medium 200, and outputs the moving image file to the signal processing unit 103. The signal processing unit 103 decodes the moving image data and audio data of the reproduced moving image file, and outputs the moving image data and audio data to the display unit 104 and the audio output unit 105, respectively. The control unit 106 stops reproduction of the moving image file when it receives an instruction to stop reproduction.

In this manner, according to the present embodiment, a threshold is set based on the amount of data needed to update the file system information and the amount of data per writing unit. Then, the alternative block remaining amount in the recording medium 200 and the threshold are compared so as to determine whether to inhibit recording of moving images. Also, even if recording of moving images is inhibited, a determination is made as to whether to permit the function of performing only file system information update. Accordingly, it is possible to reliably update the file system information, normally record the recorded data, and reproduce the data.

In the present embodiment, as shown in FIG. 6, when deleting a file, the alternative block remaining amount and the second threshold are compared, and a determination is made as to whether the remaining amount is less than or equal to the second threshold. However, besides this configuration, it is possible to employ a configuration in which, for example, whether the alternative block remaining amount is less than or equal to the second threshold is determined when file name change or folder operation of storing the file is executed.

The present embodiment has been described in the context of the recording medium 200 having a configuration capable of being attached to and detached from the video camera 100. Besides this configuration, it is also possible to employ a configuration in which a recording medium containing a flash memory is incorporated in the video camera body, and the present invention is also applicable to such a configuration.

As described above, according to the present invention, in the recording medium having alternative blocks, normal update of file system information can be performed more reliably.

The present invention may be embodied in the form of, for example, a system, an apparatus, a method, a program, a storage medium, and the like, and, specifically, the present invention may be applied to a system comprising a plurality of devices or an apparatus comprising a single device.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-022523, filed on Feb. 3, 2010, which is hereby incorporated by reference herein in its entirety.

What is claimed is:

1. A recording apparatus comprising:
a recording unit configured to record information data and file system information for managing a file containing the information data in accordance with a predetermined file system on a recording medium having a plurality of blocks including an alternative block for a defect block;
a setting unit configured to set a first threshold and a second threshold that is smaller than the first threshold; and
a control unit configured to control the recording unit in accordance with an alternative block remaining amount in the recording medium, wherein the control unit inhibits recording of the information data on the recording medium if the alternative block remaining amount in the recording medium is less than or equal to the first threshold, and inhibits updating of the file system information recorded on the recording medium if the alternative block remaining amount is less than or equal to the second threshold.

2. The apparatus according to claim 1, wherein the control unit controls the recording unit so as to stop recording of the information data if the alternative block remaining amount reaches the first threshold during recording of the information data, and thereafter record the file system information that has been updated in the recording medium.

3. The apparatus according to claim 1, comprising:
a unit configured to input information data to be recorded in the recording medium; and
a memory configured to temporarily store the input information data,
wherein the recording unit reads out the information data of a predetermined amount from the memory and records the information data of the predetermined amount on the recording medium in response to the predetermined amount of information data being stored in the memory, and
the setting unit sets a data amount that is larger than a sum of a data amount needed to update the file system information recorded in the recording medium and the predetermined amount or a number of blocks corresponding to the data amount as the first threshold.

4. The apparatus according to claim 3, wherein the recording unit reads out the information data of the predetermined amount from the memory and records the information data of the predetermined amount every time the information data of the predetermined amount is stored in the memory in a period from a recording start instruction to a recording stop instruction.

5. The apparatus according to claim 1, wherein the control unit obtains information regarding the alternative block remaining amount in the recording medium from the recording medium, and controls the recording unit so as to inhibit recording of the information data if the obtained alternative block remaining amount reaches the first threshold.

6. The apparatus according to claim 1, wherein the recording unit deletes the file from the recording medium by updating the file system information recorded on the recording medium in accordance with a file deletion instruction, and the control unit permits deletion of the file recorded on the recording medium if the alternative block remaining amount is less than or equal to the first threshold and is larger than the second threshold, and inhibits deletion of the file recorded on the recording medium if the alternative block remaining amount is less than or equal to the second threshold.

7. The apparatus according to claim 1, wherein the setting unit sets the second threshold in accordance with a data amount of the file system information recorded on the recording medium.

8. The apparatus according to claim 1, wherein the information data includes moving image data and audio data.

9. A recording apparatus comprising:

a recording unit configured to record information data as a file and file system information for managing the file containing the information data in accordance with a predetermined file system in a recording medium having a plurality of blocks including an alternative block for a defect block; and a control unit configured to control the recording unit in accordance with an alternative block remaining amount in the recording medium, wherein the control unit inhibits both recording of the information data on the recording medium and update of the file system information recorded on the recording medium if the alternative block remaining amount in the recording medium is less than or equal to a threshold, and permit update of the file system information recorded on the recording medium while inhibiting recording of the information data in the recording medium if the alternative block remaining amount in the recording medium is larger than the threshold.

10. The apparatus according to claim 9, wherein the recording unit deletes the file from the recording medium by updating the file system information recorded on the recording medium in accordance with a file deletion instruction, and the control unit permits deletion of the file recorded on the recording medium if the alternative block remaining amount is larger than the threshold, and inhibits deletion of the file recorded on the recording medium if the alternative block remaining amount is less than or equal to the threshold.

11. The apparatus according to claim 9, wherein the threshold is determined in accordance with a data amount of the file system information recorded on the recording medium.

12. The apparatus according to claim 9, wherein the information data includes moving image data and audio data.

13. A control method of a recording apparatus that records data on a recording medium having a plurality of blocks including an alternative block for a defect block, the method comprising the steps of:

recording information data and file system information for managing a file containing the information data in accordance with a predetermined file system;

setting a first threshold and a second threshold that is smaller than the first threshold; and performing control of the step of recording in accordance with an alternative block remaining amount in the recording medium, wherein recording of the information data on the recording medium is inhibited if the alternative block remaining amount in the recording medium is less than or equal to the first threshold, and update of the file system information recorded on the recording medium is inhibited if the alternative block remaining amount is less than or equal to the second threshold.

14. A control method of a recording apparatus comprising the steps of:

recording information data as a file and file system information for managing the file containing the information data in accordance with a predetermined file system on a recording medium having a plurality of blocks including an alternative block for a defect block; and performing control of the step of recording in accordance with an alternative block remaining amount in the recording medium wherein both recording of the information data on the recording medium and update of the file system information recorded on the recording medium are inhibited if the alternative block remaining amount in the recording medium is less than or equal to a threshold, and update of the file system information recorded on the recording medium is permitted while inhibiting recording of the information data on the recording medium if the alternative block remaining amount in the recording medium is larger than the threshold.

* * * * *